United States Patent
Weyer

(10) Patent No.: US 9,679,503 B2
(45) Date of Patent: Jun. 13, 2017

(54) SHELF ILLUMINATION DEVICE

(71) Applicant: Andreas Weyer, Zapfendorf (DE)

(72) Inventor: Andreas Weyer, Zapfendorf (DE)

( * ) Notice: Subject to any disclaimer, the term of this patent is extended or adjusted under 35 U.S.C. 154(b) by 507 days.

(21) Appl. No.: 14/090,039

(22) Filed: Nov. 26, 2013

(65) Prior Publication Data

US 2014/0153279 A1    Jun. 5, 2014

(30) Foreign Application Priority Data

Nov. 30, 2012    (DE) .................. 10 2012 111 677

(51) Int. Cl.
*A47F 11/10*    (2006.01)
*G09F 13/18*    (2006.01)
(Continued)

(52) U.S. Cl.
CPC ............ *G09F 13/18* (2013.01); *A47F 5/0869* (2013.01); *A47F 11/10* (2013.01); *F21S 4/20* (2016.01);
(Continued)

(58) Field of Classification Search
CPC ...... A47F 11/10; A47F 5/0869; A47F 5/0043; A47F 3/001; F21W 2131/301;
(Continued)

(56) References Cited

U.S. PATENT DOCUMENTS 5,220,739 A * 6/1993 Chich ................... G09F 13/04
40/550

5,808,708 A * 9/1998 Oyama ................ G02B 6/0018
349/62

(Continued)

FOREIGN PATENT DOCUMENTS

DE     36 12 296 A1    10/1987
DE     10220685 A1 *  11/2003   ............. A47F 11/10
(Continued)

OTHER PUBLICATIONS

Klippel Gabriele, Display shelf has fluorescent tube mounted near front edge on its underside, which is covered by light-conducting film, Nov. 20, 2003, DE10220685 (A1), English.*
(Continued)

*Primary Examiner* — Jong-Suk (James) Lee
*Assistant Examiner* — James Endo
(74) *Attorney, Agent, or Firm* — Cohen & Hildebrand, PLLC

(57) ABSTRACT

A shelf illumination device (1) for illuminating a shelf board of a shelving system. The device (1) is mounted on a component such as the shelf board. An illumination unit (4) with a plurality of light source is attached to an illumination support (3) to illuminate at least one of the shelf boards. At least one partially transparent label holder (5) receives at least one label, a shelf marking or the like. At least one light guide (6) at least in sections extends between the illumination support (3) and the label holder (5). The light guide (6) is constructed and arranged so that a portion of light emitted by the illumination unit (4) is coupled into and propagates through the light guide (6) to at least partially backlight the label holder (5), whereas the remaining portion of the light emitted by the illumination unit (4) illuminates the shelf board.

16 Claims, 5 Drawing Sheets

(51) Int. Cl.
*A47F 5/08* (2006.01)
*G09F 3/20* (2006.01)
*F21S 4/20* (2016.01)
G09F 13/04 (2006.01)
F21W 131/405 (2006.01)
F21V 8/00 (2006.01)
A47F 3/00 (2006.01)
F21W 131/301 (2006.01)
F21Y 103/10 (2016.01)
F21Y 115/10 (2016.01)

(52) U.S. Cl.
CPC ............. *G09F 3/204* (2013.01); *A47F 3/001* (2013.01); *F21W 2131/301* (2013.01); *F21W 2131/405* (2013.01); *F21Y 2103/10* (2016.08); *F21Y 2115/10* (2016.08); *G02B 6/002* (2013.01); *G02B 6/0073* (2013.01); *G02B 6/0091* (2013.01); *G02B 6/0095* (2013.01); *G09F 2013/0481* (2013.01); *G09F 2013/184* (2013.01); *G09F 2013/1831* (2013.01); *G09F 2013/1845* (2013.01)

(58) Field of Classification Search
CPC ....... F21W 2131/305; F21W 2131/405; G09F 3/204; G09F 2013/1845; G09F 2013/184; G09F 2013/0481; G02B 6/0095; G02B 6/002; G02B 6/0091; G02B 6/0073; F21S 4/20; F21S 4/22
USPC ......... 362/604, 621, 622, 92, 125, 126, 133, 362/628; 211/119.003, 90.01; 40/661.03, 40/575, 611.02, 627; 312/223.5
See application file for complete search history.

(56) References Cited

U.S. PATENT DOCUMENTS

| | | | | |
|---|---|---|---|---|
| 6,276,810 B1* | 8/2001 | Vosshenrich | ............ | A47F 11/10 362/125 |
| 6,364,273 B1* | 4/2002 | Otema | ................. | A47F 5/0043 248/235 |
| 6,558,017 B1* | 5/2003 | Saraiji | .................... | A47F 3/001 108/23 |
| 6,971,201 B2* | 12/2005 | Brinkman | ............ | G09F 3/0295 248/231.81 |
| 7,207,686 B2* | 4/2007 | Schmidt | .............. | G02B 6/0018 362/23.04 |
| 7,513,637 B2* | 4/2009 | Kelly | ..................... | A47F 3/001 362/125 |
| 2003/0137828 A1* | 7/2003 | Ter-Hovhannisian | .. | A47F 3/001 362/92 |
| 2005/0194368 A1* | 9/2005 | Sakanoue | ............... | A47F 3/001 219/214 |
| 2006/0254106 A1* | 11/2006 | Fast | ........................ | G09F 3/204 40/661.03 |
| 2007/0230212 A1* | 10/2007 | Misof | .................... | A47B 97/00 362/600 |
| 2008/0255894 A1* | 10/2008 | Falls | .................... | G06Q 10/087 705/400 |
| 2009/0079100 A1* | 3/2009 | Chen | ................ | B29D 11/00663 264/1.24 |
| 2009/0179825 A1* | 7/2009 | Enarvi | .................... | G06F 3/147 345/30 |
| 2009/0316391 A1* | 12/2009 | Huang | .................... | A47F 3/001 362/133 |
| 2010/0001660 A1* | 1/2010 | Pas | ........................ | A47F 3/001 315/292 |
| 2011/0044030 A1* | 2/2011 | Pichel | ..................... | A47F 11/10 362/125 |
| 2011/0204009 A1* | 8/2011 | Karan | ...................... | A47F 1/12 211/59.2 |
| 2012/0106129 A1* | 5/2012 | Glovatsky | ............... | A47F 3/001 362/92 |
| 2012/0230018 A1* | 9/2012 | Wiemer | .................. | A47F 5/103 362/133 |

FOREIGN PATENT DOCUMENTS

| | | | |
|---|---|---|---|
| DE | EP 2106726 A1 * | 10/2009 | ............ A47F 11/10 |
| FR | 2 803 995 A3 | 7/2001 | |
| WO | 2011/114026 A1 | 9/2011 | |

OTHER PUBLICATIONS

Roehricht Klaus, Shelf assembly, Oct. 7, 2009, EP2106726 (A1), English.*
German Office Action dated May 14, 2013 in counterpart German Patent Application Serial No. 10 2012 111 677.6 (6 pages).

* cited by examiner

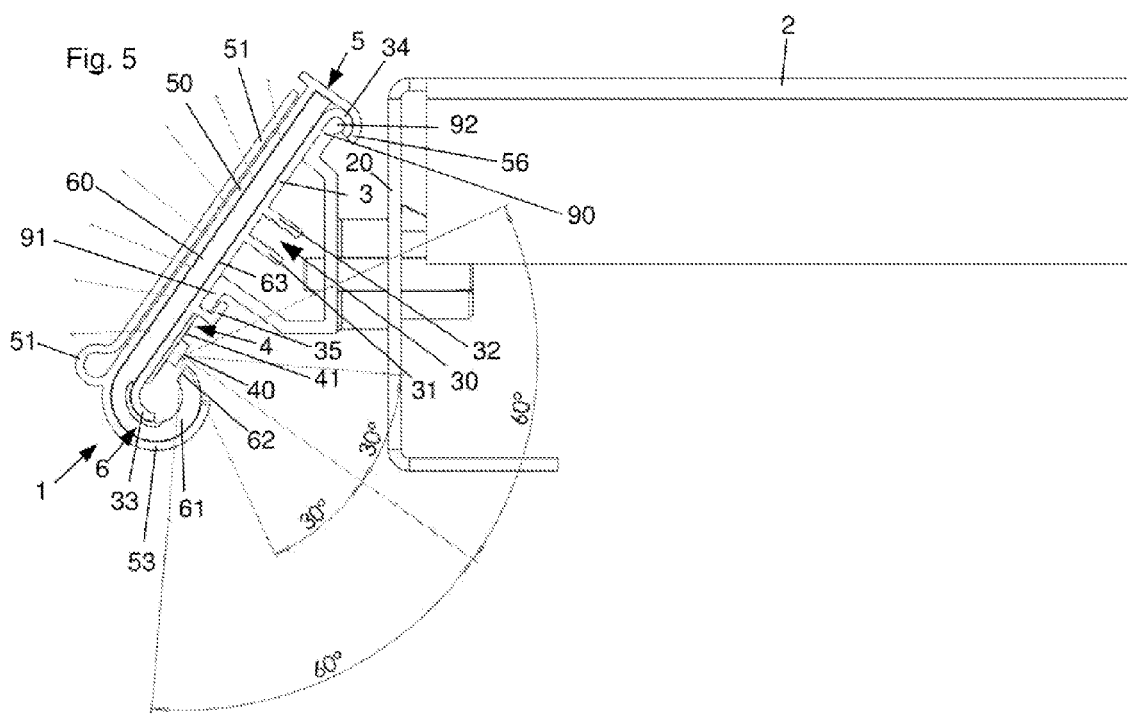

SHELF ILLUMINATION DEVICE

CROSS-REFERENCE TO RELATED APPLICATIONS

This is an application claiming priority to DE 10 2012 111 677.6, filed on Nov. 30, 2012, which is hereby incorporated by reference in its entirety.

BACKGROUND OF THE INVENTION

The present invention relates to a shelf illumination device for illuminating a shelf board of a shelving system, including means for mounting the shelf illumination device on a component, in particular a shelf bottom of the shelving system, an illumination means support, an illumination means with a plurality of illumination means which is mounted on the illumination means support so as to be able to illuminate at least one of the shelf boards of the shelving system during operation, and an at least partially transparent label holder configured to receive at least one label, at least one shelf marker and the like.

Various embodiments of shelf illumination devices are known in the art. To date, two separate illumination means have been used in various shelf illumination devices for backlighting a label holder with a label received therein and the like, and for illuminating a shelf board of a shelving system. The structure of the prior art shelf illumination devices is complicated and therefore expensive because they require two separate illumination means. Furthermore, the label received by the label holder can frequently not be uniformly backlit. Label holders are also known which in combination with cold cathode fluorescent lamps or T5 fluorescent tubes, which have a beam, angle of 360°, are able to illuminate both the label and the shelf.

BRIEF SUMMARY OF THE INVENTION

It is therefore the object of the present invention to provide a shelf illumination device of the aforementioned type that has a simple construction and enables efficient illumination of the shelf board and the label holder.

The solution of this object provides a shelf illumination device for illuminating a shelf board of a shelving system including a device for mounting the shelf illumination device on a component, in particular on a shelf board of the shelving system. The shelf illumination device further including an illumination support, an illumination unit with a plurality of light sources, wherein the illumination unit is attached on the illumination support so as to be able to illuminate at least one of the shelf boards of the shelving system during operation. In addition, the shelf illumination device also includes an at least partially transparent label holder adapted to receive at least one label, a shelf marking and the like. The shelf illumination device has at least one light guide which at least in sections extends between the illumination support and the label support and which is constructed and arranged so that a portion of the light emitted by the illumination unit can be coupled into the light guide during the operation and can propagate in the light guide so as to be able to at least partially backlight the label holder, whereas the remaining portion of the light emitted by the illumination unit can illuminate the shelf board. The dependent claims relate to advantageous embodiments of the invention.

A shelf illumination device according to the invention is characterized in that the shelf illumination device has at least one light guide which extends at least in sections between the illumination means support and the label holder and which is constructed and arranged so that a portion of light emitted by the illumination means during operation can be coupled into the light guide and propagate therein so as to at least partially backlight the label holder, while the remaining portion of the light emitted by the illumination means illuminates the shelf board. The shelf illumination device according to the invention advantageously requires only a single illumination means to both illuminate the shelf and to backlight the label holder and a label received in the label holder or a shelf marking received in the label holder and the like. The structure of the shelf illumination device can be simplified compared to the embodiments known in the art. The portion of the light emitted by the illumination means and coupled into the light guide can propagate in the light guide and efficiently backlight the label holder with the label or the shelf marking received therein. The illumination means support on which the illumination means is mounted, is preferably planar in sections and made of a heat-conductive, in particular metallic material (for example, aluminum). In this way, at least part of the heat generated by the illumination means can be dissipated during the operation of the shelf illumination device. Furthermore, the metallic material adds strength and stability to the shelf illumination device, making it possible for example to produce shelf illumination devices of up to 3.5 meters in length. The illumination means support made of a metallic material is advantageously also capable of receiving a strain relief for an electrical connection cable.

In a preferred embodiment, the label holder may have a first surface section and second surface section, which are plane-parallel, wherein a receiving area suitable for receiving at least one label or a shelf marking is formed between the surface sections.

In a particularly advantageous embodiment, the two surface sections may be integrally connected to each other by a section-wise bent spring section. The spring section advantageously allows a non-slip attachment of the label or shelf marking in the receiving area between the two plane-parallel surface sections.

Preferably, the label holder may be made of a transparent plastic material, in particular of polyvinyl chloride (PVC), polycarbonate (PC) or polymethyl methacrylate (PMMA). This enables a simple and inexpensive manufacture of the label holder.

In an advantageous embodiment of the invention, the means for mounting the shelf illumination device on a component of the shelving system may include a planar retaining section which is formed so that it can be brought into abutment in particular with a topside or an underside of a shelf board and in particular be attached thereto with an adhesive. The adhesive may be, for example, a double-sided adhesive tape that can be easily applied to the retaining section and the topside of the shelf. This allows a simple and intuitively operable attachment of the shelf illumination device on the shelf board. To keep the number of components of the manufactured shelf illumination device as small as possible, the planar retaining section may preferably be formed integrally with the label holder. In principle, the retaining section may also be applied on the underside of a shelf board, wherein greater forces then act on the connection point, which require a stronger attachment. Attachment on the topside is thus more advantageous for easy and safe attachment of the illumination apparatus on the shelf board. Attachment to the underside of a shelf facilitates filling the shelf board due to the elimination of an interfering edge of the retaining section on the topside of the shelf board.

In an alternative embodiment, the means for mounting the shelf illumination device on a part of the shelving system may also include a mounting bracket, which is configured for attachment on the shelf board, in particular on a front face of the shelf board. Preferably, the mounting bracket may be designed so that it can be inserted into a corresponding receiving opening in the front face of the shelf board, and positively or non-positively fixed therein. The mounting bracket is preferably made of polycarbonate (PC). The mounting bracket may in particular have a first profile section and a second profile section, which extend in the transverse direction of the shelf illumination device parallel to a planar section of the illumination means support. The first profile portion may include on its free end a thickening configured to engage during assembly from below in an upper section of the illumination means support that is curved at least in sections. The illumination means support may further include an at least partially transversely extending retaining section which is shaped so as to be able to partially overlap the free end of the second profile leg.

In a particularly advantageous embodiment, the light guide may be made of transparent polymethyl methacrylate. The light guide can then be produced easily and inexpensively. Moreover, polymethyl methacrylate (PMMA) is characterized by very good light guiding properties.

According to a particularly advantageous embodiment, the illumination of the label holder can be improved and made more homogeneous by applying to the surface of the light guide facing the illumination means support a surface treatment, in particular a white-colored layer, a reflective layer, an imprinted geometric pattern (in particular by screen printing or pad printing; for example, a grid pattern), a laser engraving, or a V-cut engraving. The geometric pattern attainable with a printing process may be regular or not.

In an advantageous embodiment, the light guide may have a lower section, which is curved in sections and which is arranged so that a free end of the lower section extends partially over the light exit surfaces of the illumination means. Preferably, the free end of the lower section of the light guide is arranged so that about 20% of the light emitted from the illumination means of the illumination means is coupled into the light guide. The remaining about 80% of the light emitted by the illumination means can be at least partially used for illuminating the shelf board of the shelving system and the items arranged thereon.

In an advantageous embodiment of the invention, a lower section of the illumination means support and a lower section of the label holder may be curved, wherein the curvatures of the bottom sections of the illumination means support, of the label holder and of the light guide are selected so that during assembly the lower section of the illumination means support can be brought into abutment inside the lower section of the light guide and the lower section of the light guide can be brought into abutment inside the lower section of the label holder. In order to securely retain the illumination means support and the light guide on the label holder, the label holder has preferably a retaining strip extending in the transverse direction parallel to the first surface section, so that the illumination means support and the light guide can be inserted from the side and secured between the retaining strip and the first surface section, wherein the holding strip overlaps an upper edge of the illumination means support (preferably without clearance).

In a particularly advantageous embodiment, the illumination means may be light-emitting diodes, which are preferably arranged on a support strip with a spacing therebetween. Light-emitting diodes are distinguished by a high efficiency, a low power consumption, as well as a long service life. The light-emitting diodes can be designed, for example, so as to emit light in the vertical direction at an emission angle of about 120°.

BRIEF DESCRIPTION OF THE DRAWINGS

Additional features and advantages of the present invention will become apparent from the following description of preferred embodiments with reference to the appended drawings, which show in.

DETAILED DESCRIPTION OF THE INVENTION

Figure 1:
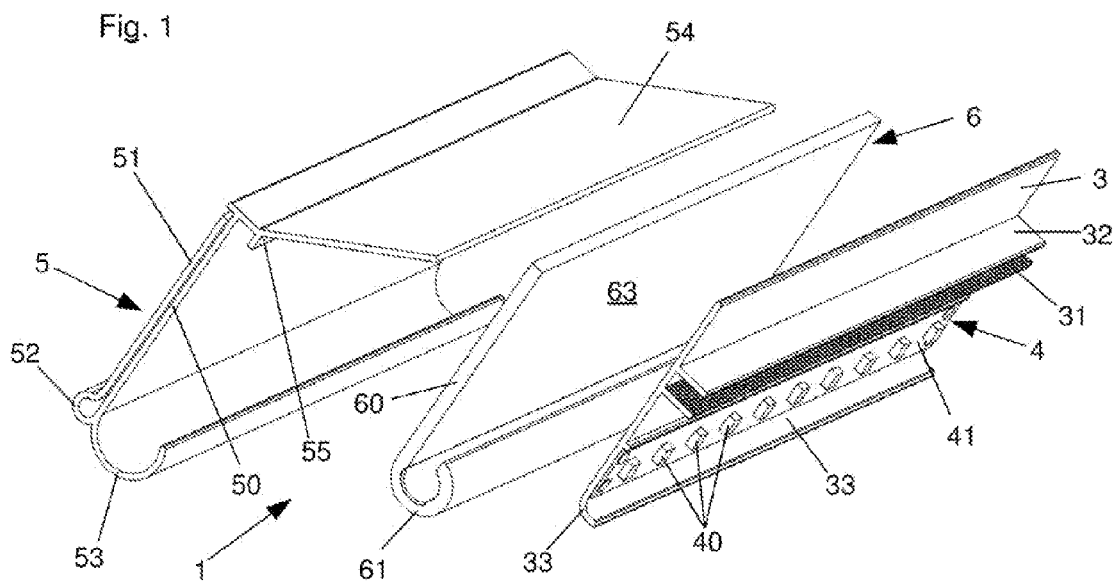
FIG. 1 an exploded view of a shelf illumination device which is constructed according to a first embodiment of the present invention, FIG. 2 a side view of the shelf illumination device according to FIG. 1, FIG. 3 a perspective view of the shelf illumination device, FIG. 4 another perspective view of the shelf illumination device, and FIG. 5 a side view of a shelf illumination device which is constructed according to a second embodiment of the present invention.

A first embodiment of a shelf illumination device 1 will now be described in more detail with reference to FIGS. 1 to 4. The shelf illumination device 1 includes an illumination means support 3, and relatively narrow, strip-shaped illumination means 4 having a plurality light-emitting diodes 40 arranged on a support strip 41, wherein the illumination means 4 is attached on the illumination means support 3, and a label holder 5 configured to receive at least a label, a shelf marking and the like, as well as a light guide 6 extending partially between the illumination means support 3 and the label holder 5.

Figure 2:
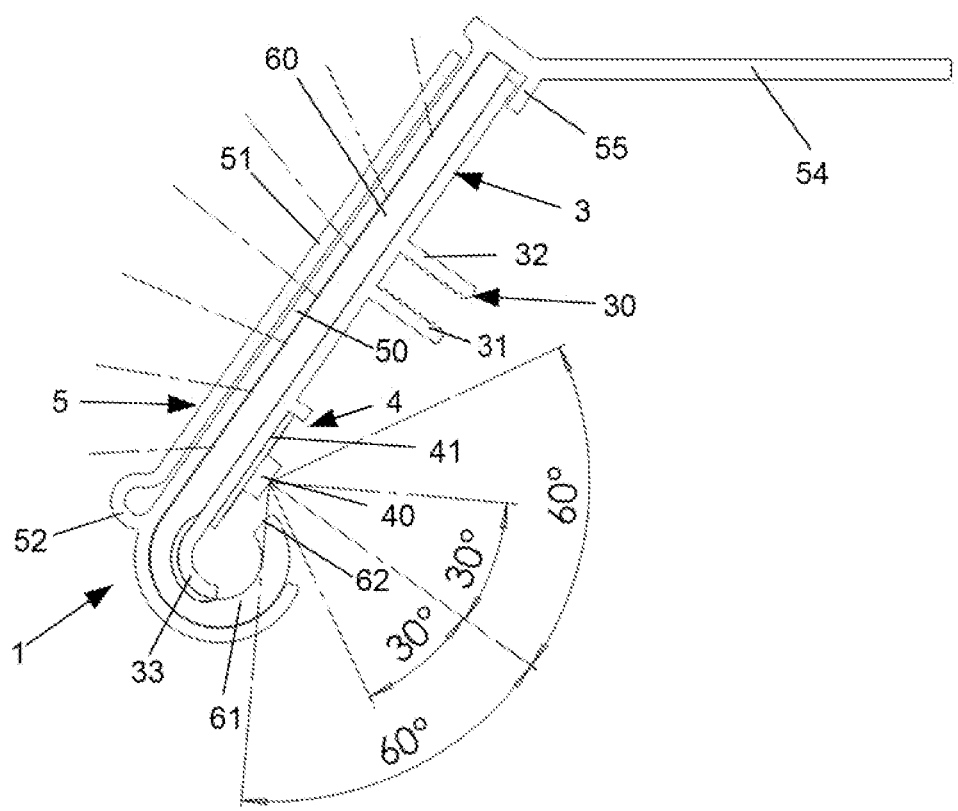
Figure 3:
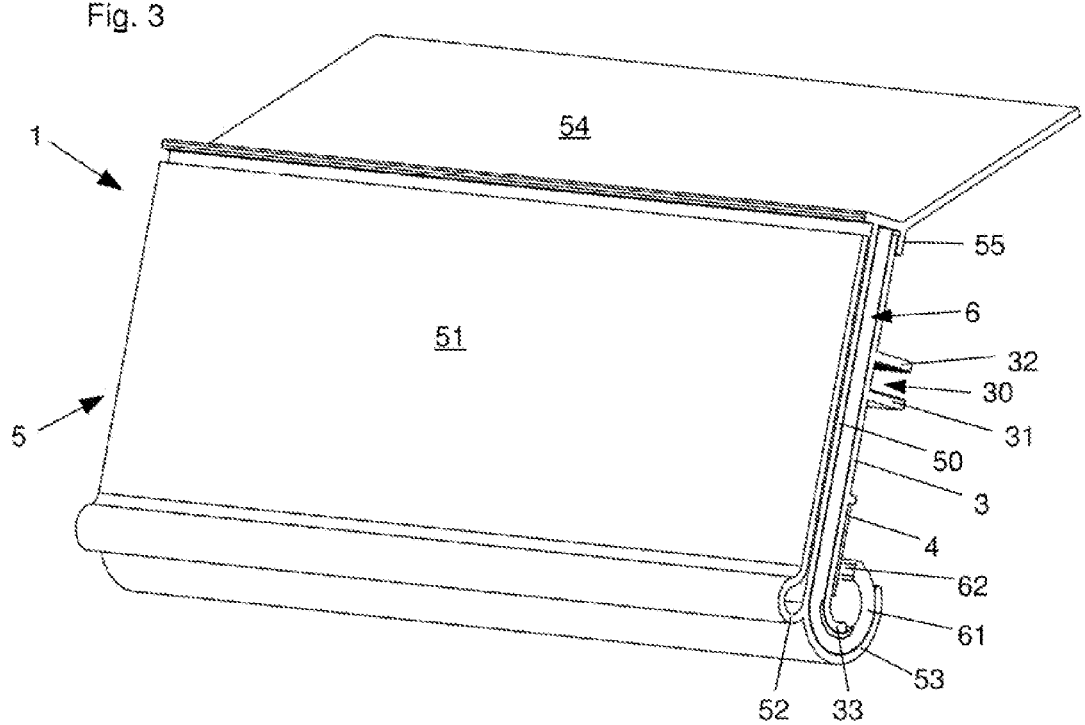

As can be seen in particular in FIG. 2, the light-emitting diodes 40 of the strip-shaped illumination means 4 are arranged spaced-apart (preferably equidistantly) and side by side in the transverse direction of the shelf illumination device 1. The illumination means support 3 on which the illumination means 4 is mounted is planar in sections and preferably made of a heat-conductive, in particular metallic material (for example aluminum). In this way, at least part of the heat generated by the light-emitting diodes 40 of the illumination means 4 can be dissipated during operation of the shelf illumination device 1. Furthermore, the metallic material increases the strength of the shelf illumination device 1, enabling shelf illumination devices 1 to be manufactured with lengths of up to 3.5 meters. The illumination means support 3 which is made of a metallic material is advantageously capable of receiving a strain relief 7 for an electrical connection cable 8, as will be explained below.

The illumination means support 3 also has a profile channel section 30 with two profile legs 31, 32 which extend parallel to one another in the transverse direction. The strip-shaped illumination means 4 is arranged in a lower region of the planar section of the illumination means support 3. A lower section 33 of the illumination means support 3, which in this example is slightly curved (in the direction toward the illumination means 4), connects to the lower region.

The label holder 5 in this exemplary embodiment is integrally made of a transparent plastic material, in particular polyvinyl chloride (PVC), polycarbonate (PC) or polymethyl methacrylate (PMMA) and has a first surface section 50 and a second surface section 51. The two surface sections 50, 51 are plane-parallel and are connected with each other by a bent spring section 52. A receiving section (not provided with reference numerals), in which at least one label, in particular a label marking goods and/or a price tag, a shelf marking and the like can be arranged, is formed between the two plane-parallel surface sections 50, 51. The spring section 52 enables a non-slip attachment of the label or shelf marking in the receiving area between the two plane-parallel surface sections 50, 51. A lower section 53 of the label holder 5 is in the present example formed as a curved channel.

In this exemplary embodiment, the label holder 5 includes in an upper section a planar retaining section 54 which is formed so that it can be in particular brought into abutment with and affixed to the topside of a shelf board that is not explicitly shown in FIGS. 1 to 4. Preferably, the retaining section 54 can be glued to the shelf board—in particular by using a double-sided adhesive tape, so as to securely retain the shelf illumination device 1 on the shelf board. In the illustrated exemplary embodiment, the planar retaining section 54 encloses with the first surface section 50 of the label holder 5 an angle of about 125°. It should be noted here that the retaining section 54 and the first surface section 50 of the label holder 5 may also enclose with each other an angle that is smaller or greater than 125°. In principle, the retaining section 54 may also be attached on the underside of a shelf board, which causes greater forces to act on the joint, requiring a stronger attachment. Attachment to the topside is thus advantageous for easier and safer attachment of shelf illumination device 1 on the shelf board. Attachment to the underside of a shelf board facilitates filling the shelf board due to the elimination of an interfering edge of the retaining section 54 on the topside of the shelf board.

The light guide 6 extending in sections between the illumination means support 3 and the label holder 5 is made of a transparent light-guiding plastic material, preferably polymethyl methacrylate (PMMA). A first section 60 of the light guide 6 is constructed planar and extends between the planar section of the illumination means support 3 and the first surface section 50 of the label holder 5, so that these extend parallel to each other. A lower section 61 of the light guide 6 is designed as a curved channel and extends partially between the curved lower section 33 of the illumination means support 3 and the likewise curved lower section 53 of the label holder 5. The curvatures of the bottom sections 33, 53, 61 of the illumination means support 3, of the label holder 5 and of the light guide 6 are selected so that during assembly the lower section 33 of the illumination means support 3 can be brought into abutment inside of the lower section 61 of the light guide 6, and the lower section 61 of the light guide body 6 can be brought into abutment inside the lower section 53 of the label holder 5. To securely retain the illumination means support 3 and of the light guide 6 on the label holder 5, the label holder 5 has in this embodiment a retaining strip 55 extending parallel to the first surface section 50 in the transverse direction, so that the illumination means support 3 and the light guide 6 can be inserted from the side and can be affixed between the retaining strip 55 and the first surface section 50, wherein the retaining strip 55 overlaps an upper edge of the illumination means support 3 without clearance.

In particular, FIG. 2 clearly shows that a free end 62 of the lower section 61 of the light guide 6 formed as a curved channel is facing the light-emitting diodes 40 of the illumination means 4, and partially overlaps the light exit surfaces of the light-emitting diodes 40. This allows a portion of the light emitted by the light-emitting diodes 40 during the operation to enter the light guide 6 through the free end 62 of the curved section 61 of the light guide 6 and to propagate inside the light guide 6. The free end 62 of the curved section 61 of the light guide 6 thus forms a light input for at least a portion of light 40 emitted by the light emitting diodes. In this way, the label holder 5 and the label or shelf marking arranged in the receiving area between the two plane-parallel surface sections 50, 51 can be backlit. The remaining portion of the light emitted by the light-emitting diodes 40 is then able to illuminate a shelf section, in particular a shelf board disposed underneath the shelf board to which the shelf illumination device 1 is attached. The light-emitting diodes 40 are presently designed to emit light in the vertical direction at an emission angle of about 120°. Preferably, the free end 62 of the lower section 61 of the light guide 6 is arranged so that about 20% of the light emitted by the light-emitting diodes 40 of the illumination means 4 is coupled into the light guide 6. The remaining about 80% of the light emitted by the light-emitting diodes 40 can be at least partially used for illuminating the shelf board of the shelving system and the items arranged thereon.

The surface 63 of the light guide 6 facing the illumination means support 3 has preferably a surface treatment to improve the illumination effects. For example, the surface 63 may have, for example, a white-colored layer or a reflective layer. Alternatively, the surface 63 may have a laser engraving, or a V-cut engraving. Alternatively, the surface 63 may have a geometric pattern obtained with a printing process (in particular by screen printing or pad printing; for example, a grid pattern). The printed geometric pattern may be regular or irregular.

Figure 4:
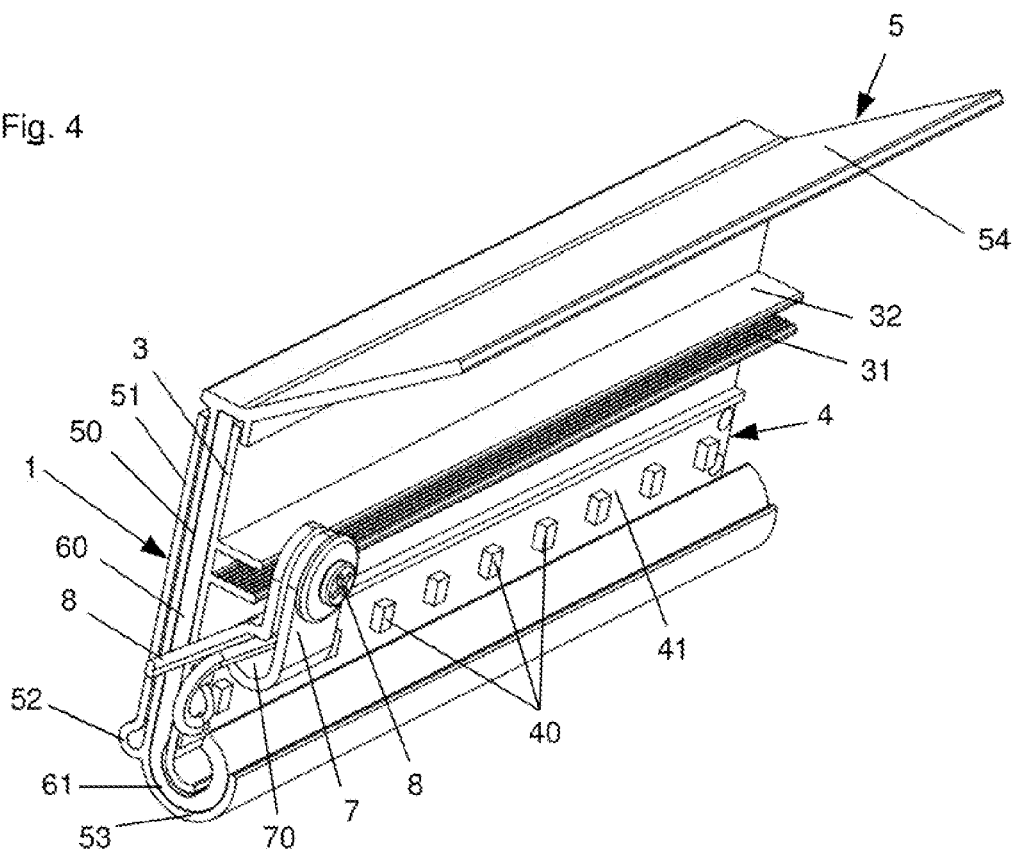

As can be seen in FIG. 4, a strain relief 7 is arranged between the two profile legs 31, 32 of the profile channel section 30 and affixed with a fastening screw 8. The strain relief 7 has a guide eyelet 70, through which a two-wire electric connection cable 8 passes, with the wires of the connection cable 8 being connected to two corresponding electrical terminals on the illumination means support 41. The strain relief 7 advantageously provides strain relief for the electrical connection cable 8 and prevents the wires of the electrical connection cable 8 from inadvertently becoming detached from the electrical terminals due to a pulling force.

A second embodiment of a shelf illumination device 1 will now be explained in more detail below with reference to FIG. 5. The shelf illumination device 1 differs from the above-described first embodiment primarily in the structural design of the label holder 5 and the illumination means support 3. The illumination means support 3 is in this embodiment also made of a heat-conductive material, in particular of aluminum or another metallic material, and is planar in sections. The illumination means 4 arranged in the lower region of the planar section of the illumination means support 3 is strip-shaped and has a plurality of light-emitting diodes 40 arranged on a support strip 41 which are arranged spaced-apart (preferably equidistantly) side by side in the transverse direction of the shelf illumination device 1. The illumination means support 3 further includes a profile channel section 30 with two profile legs 31, 32 extending parallel to each other in the transverse direction of the shelf illumination device 1 and configured to receive the strain relief which is not explicitly shown here. For this purpose, the illumination means support 3 is preferable also made of a metallic material. The lower section 33 of the illumination means support 3 is in turn formed as a curved channel. An upper section 34 of the illumination means support 3 is also formed as a curved channel.

The label holder 5, which is suitable for receiving at least a label, a shelf marking and the like, is integrally made of a transparent plastic material, in particular polyvinyl chloride (PVC), polycarbonate (PC) or polymethyl methacrylate (PMMA), and has a first surface section 50 and a second surface section 51. The two surface sections 50, 51 are plane-parallel and connected to each other by a curved spring section 52. A receiving section (not provided with reference numerals) is formed between the two plane-parallel surface sections 50, 51, in which at least one label, in particular a label for goods and/or a price tag or a shelf marking can be arranged. A lower section 53 of the label holder 5 is formed as a curved channel. A free end 56 of an upper section of the label holder 5 is also curved in sections.

The light guide 6, which extends in sections between the illumination means support 3 and the label holder 5, is preferably manufactured of a transparent light-conductive plastic material, in particular of polymethyl methacrylate (PMMA), and has a planar section 60 extending between the planar section of the illumination means support 3 and the first surface section 50 of the label holder 5, so that these extend parallel to each other. A lower section 61 of the light guide 6 is constructed as a curved channel and extends in sections between the curved lower section 33 of the illumination means support 3 and the likewise curved lower section 53 of the label holder 5. The curvatures of the bottom sections 33, 53, 61 of the illumination means support 3, of the label holder 5 and of the light guide 6 are selected so that during assembly, the lower section 33 of the illumination means support 3 can be brought into abutment inside on the lower section 61 of the light guide 6, and the lower section 61 of the light guide body 6 can be brought into abutment inside on the lower section 53 of the label holder 5. The curved free end 56 of the upper section of the label holder 5 extends after assembly beyond the upper curved section 34 of the illumination means support 3 and overlaps the curved section 34 for a secure attachment of the illumination means support 3 and of the light guide 6 arranged between the illumination means support 3 and the label holder 5.

The illumination device 1 includes a mounting bracket 9 for attachment to a shelf board 2, wherein the mounting bracket 9 is configured for attachment on a front side 20 of the shelf board 2. Preferably, the attachment bracket 9 is made of polycarbonate (PC). The mounting bracket 9 has a first profile section 90 and a second profile section 91, which extend parallel to the planar section of the illumination means support 3 in the transverse direction of the shelf illumination device 1. The first profile section 90 has at its free end a thickening 92 which engages in the upper curved section 34 of the source carrier 3 when installed from below. The illumination means support 3 also has a retaining section 35 extending at least in sections in the transverse direction and being shaped so as to be able to overlap the free end of the second profile leg 91 in sections, As can also be seen in FIG. 5, a free end 62 of the lower curved section 61 of the light guide 6 is facing the light-emitting diodes 40 of the illumination means 4, and extends partially across the light exit surfaces of the light-emitting diodes 40. This ensures that a portion of the light emitted by the light-emitting diodes 40 during the operation is able to enter of the light guide 6 through the free end 62 of the curved section 61 in the light guide 6 and to propagate inside the light guide 6. In this way, the label holder 5 and the label or the shelf marking arranged in the receiving area between the two plane-parallel surface sections 50, 51 can be backlit. The remaining portion of light emitted by the light-emitting diodes 40 is capable of illuminating a shelf section, in particular a shelf board disposed underneath the shelf board to which the illumination device 1 is attached. The light-emitting diodes 40 are presently designed so as to emit light in the vertical direction at an emission angle of about 120°. Preferably, the free end 62 of the lower section 61 of the light guide 6 is arranged so that about 20% of light emitted by the light-emitting diodes 40 of the illumination means 4 is coupled into the light guide 6. The remaining about 80% of the light emitted by the light-emitting diodes 40 can be used at least partially for illuminating the shelf board of the shelving system and the items arranged thereon.

The surface 63 of the light guide 6 facing the illumination means support 3 has in this exemplary embodiment preferably also a surface treatment for improving the illumination effect. For example, the surface 63 may have, for example, a white-colored surface layer or a reflective layer. Alternatively, the surface 63 may have a laser engraving, or a V-cut engraving. Alternatively, the surface 63 may have a geometric pattern (for example, a grid pattern) obtained with a printing process (in particular by screen printing or pad printing). The printed geometric pattern can be regular or irregular.

The invention claimed is:

1. A shelf illumination device (1) for illuminating a shelf board of a shelving system, comprising:
   a device for mounting the shelf illumination device (1) on the shelf board (2) of the shelving system;
   an illumination support (3);
   an illumination unit (4) with a plurality of light sources, wherein the illumination unit (4) is attached on the illumination support (3) so as to be able to illuminate the shelf board of the shelving system during operation; and
   an at least partially transparent label holder (5) which is adapted to receive at least one of a label and a shelf marking,
   the shelf illumination device (1) comprises at least one light guide (6) which at least in sections extends between the illumination support (3) and the label holder (5) and which is constructed and arranged so that a portion of the light emitted by the illumination unit (4) is coupled into the light guide (6) during the operation and propagates in the light guide (6) so as to be able to at least partially backlight the label holder (5), whereas the remaining portion of the light emitted by the illumination unit (4) illuminates the shelf board;
   a first section (60) of the light guide (6) is planar; and
   wherein the light guide (6) has a lower section (61) which is curved in sections and which is arranged so that a free end (62) of the lower section partially extends across light exit surfaces of the illumination device;
   wherein a lower section (33) of the illumination support (3) and a lower section (53) of the label holder (5) are curved, wherein the curvatures of the lower sections (33, 53, 61) of the illumination support (3), of the label holder (5) and of the light guide (6) are selected so that, during assembly, the lower section (33) of the illumination support (3) is constructed to be brought into abutment inside on the lower section (61) of the light guide (6) and the lower section (61) of the light guide (6) is constructed to be brought into abutment inside on the lower section (53) of the label holder (5).

2. The shelf illumination device (1) according to claim 1, wherein the label holder (5) has a first surface section (50)

and a second surface section (51) that are plane-parallel, wherein a receiving area configured to receive the at least one of the label and the shelf marking is formed between the first and second surface sections (50, 51).

3. The shelf illumination device (1) according to claim 2, wherein the first and second surface sections (50, 51) are interconnected integrally by a spring section (52) that is bent in sections.

4. The shelf illumination device (1) according to claim 2, wherein the first section (60) of the light guide (6) extends between a planar section of the illumination support (3) and the first surface section (50) of the label holder (5), so that the first section (60) of the light guide (6), the planar section of the illumination support (3) and the first surface section (50) of the label holder (5) are parallel to one another.

5. The shelf illumination device (1) according to claim 1, wherein the label holder (5) is made of a transparent plastic material.

6. The shelf illumination device (1) according to claim 5, wherein the label holder (5) is made of polyvinylchloride, polycarbonate or polymethyl methacrylate.

7. The shelf illumination device (1) according to claim 1, wherein the device for mounting the shelf illumination device (1) on the shelf board of the shelving system comprises a planar retaining section (54) constructed to be brought into abutment of the shelf board, and affixed thereon.

8. The shelf illumination device (1) according to claim 7, wherein the planar retaining section (54) is constructed to be brought into abutment on a topside or an underside of the shelf board.

9. The shelf illumination device (1) according to claim 7, wherein the planar retaining section (54) is affixed to the shelf board with adhesive.

10. The shelf illumination device (1) according to claim 1, wherein the device for mounting the shelf illumination device (1) on the shelf board of the shelving system comprises a mounting clip (9) constructed for attachment on the shelf board (2).

11. The shelf illumination device (1) according to claim 10, wherein the mounting clip (9) is constructed for attachment on a front face (20) of the shelf board (2).

12. The shelf illumination device (1) according to claim 1, wherein the light guide (6) is made of transparent polymethyl methacrylate.

13. The shelf illumination device (1) according to claim 1, wherein a surface (63) of the light guide (6) facing the illumination support (3) has a surface treatment.

14. The shelf illumination device (1) according to claim 13, wherein the surface treatment is a white-colored layer, a reflective layer, a printed geometric pattern, a laser engraving or a V-cut engraving.

15. The shelf illumination device (1) according to claim 1, wherein the plurality of light sources are light emitting diodes (40).

16. The shelf illumination device (1) according to claim 15, wherein the light emitting diodes (40) are arranged with a mutual spacing on a support strip (41).

* * * * *